US008731325B2

(12) United States Patent
Marchesotti

(10) Patent No.: US 8,731,325 B2
(45) Date of Patent: *May 20, 2014

(54) AUTOMATIC GENERATION OF A PHOTO GUIDE

(71) Applicant: Xerox Corporation, Norwalk, CT (US)

(72) Inventor: Luca Marchesotti, Grenoble (FR)

(73) Assignee: Xerox Corporation, Norwalk, CT (US)

( * ) Notice: Subject to any disclaimer, the term of this patent is extended or adjusted under 35 U.S.C. 154(b) by 18 days.

This patent is subject to a terminal disclaimer.

(21) Appl. No.: 13/680,360

(22) Filed: Nov. 19, 2012

(65) Prior Publication Data

US 2013/0156341 A1 Jun. 20, 2013

Related U.S. Application Data

(63) Continuation of application No. 12/049,520, filed on Mar. 17, 2008, now Pat. No. 8,340,452.

(51) Int. Cl.
*G06K 9/40* (2006.01)
*G01N 37/00* (2006.01)

(52) U.S. Cl.
USPC .............................. 382/275; 702/81; 702/84

(58) Field of Classification Search
USPC .................. 382/112, 254, 266, 224, 275; 348/14.12, 92; 700/109; 702/69, 81, 702/84; 283/77, 112; 358/3.23, 447
See application file for complete search history.

(56) References Cited

U.S. PATENT DOCUMENTS

| 5,347,374 | A | 9/1994 | Fuss et al. |
| 5,357,352 | A | 10/1994 | Eschbach |
| 5,363,209 | A | 11/1994 | Eschbach et al. |
| 5,371,615 | A | 12/1994 | Eschbach |
| 5,414,538 | A | 5/1995 | Eschbach |
| 5,450,217 | A | 9/1995 | Eschbach et al. |
| 5,450,502 | A | 9/1995 | Eschbach et al. |
| 5,802,214 | A | 9/1998 | Eschbach et al. |
| 7,031,534 | B2 | 4/2006 | Buckley |
| 7,154,544 | B2 | 12/2006 | Kowno et al. |
| 7,680,341 | B2 | 3/2010 | Perronnin |
| 7,756,341 | B2 * | 7/2010 | Perronnin ............... 382/224 |
| 7,885,466 | B2 * | 2/2011 | Perronnin ............... 382/224 |
| 7,898,696 | B2 * | 3/2011 | Marchesotti et al. ... 358/3.27 |
| 7,933,454 | B2 * | 4/2011 | Bressan et al. .......... 382/224 |

(Continued)

OTHER PUBLICATIONS

F.Perronnin, C.Dance, G.Csurka, M.Bressan, Adapted Vocabularies for Generic Visual Categorization, *ECCV, Part IV, LNCS* 3954, pp. 464-475, 2006.

(Continued)

*Primary Examiner* — Abolfazl Tabatabai
(74) *Attorney, Agent, or Firm* — Fay Sharpe LLP

(57) ABSTRACT

An apparatus, method and an image quality guide document are disclosed. The method includes, for at least one image in a set of images undergoing image enhancement, identifying image quality-related features for the image based on enhancements being applied to the image, identifying image content-related features based on content of the image, determining a content-based degradation of the image based on the identified image quality-related features and image content-related features, and generating a thumbnail of the image. The method further includes generating an image quality guide document for the set of images in which at least one of the thumbnails is associated with a respective text description that is based on the determined content-based degradation.

19 Claims, 4 Drawing Sheets

(56) References Cited

U.S. PATENT DOCUMENTS

| | | | |
|---|---|---|---|
| 8,009,921 B2 * | 8/2011 | Csurka | 382/228 |
| 8,059,815 B2 | 11/2011 | Lofgren et al. | |
| 2002/0172419 A1 | 11/2002 | Lin et al. | |
| 2003/0044178 A1 | 3/2003 | Oberhardt et al. | |
| 2003/0081842 A1 | 5/2003 | Buckley | |
| 2003/0151674 A1 | 8/2003 | Lin | |
| 2004/0258308 A1 | 12/2004 | Sadovsky et al. | |
| 2005/0168561 A1 | 8/2005 | Furuki et al. | |
| 2006/0228040 A1 | 10/2006 | Simon et al. | |
| 2006/0274950 A1 | 12/2006 | Fan et al. | |
| 2007/0005356 A1 | 1/2007 | Perronnin | |
| 2007/0009167 A1 | 1/2007 | Dance et al. | |
| 2007/0258648 A1 | 11/2007 | Perronnin | |
| 2008/0144068 A1 | 6/2008 | Digby | |

OTHER PUBLICATIONS

G.Csurka, J.Williamowski, C.R.Dance, F.Perronnin, Incorporating Geometry Information with Weak Classifiers for Improved Generic Visual Categorization, *EU Project, LAVA*, (IST-2001-34405), pp. 1-8.

B.Leibe, A.Leonardis, B.Schiele, Combined Object Catergorization and Segmentation with an Implicit a Shape Model, in *Proc. ECCV Workshop on Statistical Learning in Computer Vision*, pp. 17-32, 2004.

G.Csurka, C.Dance, L.Fan, J.Williamowski, C.Bray, Visual Categorization with Bags of Keypoints, in *Proc. ECCV International Workshop on Statistical Learning in Computer Vision*, 2004, pp. 1-16.

R.Fergus, P.Perona, A.Zisserman, Object Class Recognition by Unsupervised Scale-Invariant Learning, in *Proc. CVPR*, vol. 2, pp. 264-271, 2003.

M.Bressan, C.Dance, R.Poirier, D.Arregui, Local Contrast Enhancement, in *SPIE, Electronic Imaging*, 2007, pp. 1-12.

J.Sivic, B.C.Russell, A.A.Efros, A.Zisserman, W.T.Freeman, Discovering Objects and Their Location in Images, *MIT AI Lab Memo AIM-2005-005*, Feb. 2005, pp. 1-8.

P.Quelhas, F.Monay, J.M.Odobez, D.Gatica-Perez, T.Tuytelaars, L.VanGool, Modeling Scenes with Local Descriptors and Latent Aspects, in *Proc. of the Tenth IEEE ICCV*, vol. 1, pp. 883-890, 2005.

E.B.Sudderth, A.Torralba, W.T.Freeman, A.S.Willsky, Describing Visual Scenes Using Transformed Dirichlet Processes, *Conference of Neural Information Processing Systems*, 2005, pp. 1-8.

S.Fidler, G.Berginc, A.Leonardis, Hierarchical Statistical Learning of Generic Parts of Object Structure, in *Proc. of the 2006 IEEE Computer Society Conference on CVPR*, vol. 1, pp. 182-189, 2006.

D.J.Crandall, D.P.Huttenlocher, Weakly Supervised Learning of Part-Based Spatial Models for Visual Object Recognition, *ECCV, Part 1, LNCS 3951*, pp. 16-29, 2006.

P.Carbonetto, N.deFreitas, K.Barnard, A Statistical Model for General Contextual Object Recognition, in *ECCV2004*, pp. 1-13.

A.Bosch, A.Zidderman, X.Monay, Scene Classification Via pLSA, in *ECCV*, 2007, pp. 1-14.

H.Kuck, P.Carbonnetto, N.deFreitas, A Constrained Semi-Supervised Learning Approach to Data Association, in *ECCV*, 2004, pp. 1-12.

S.Ait-Mokhtar, J.P.Chanod, C.Roux, A Multi-Input Dependency Parser, in *Proc. of the 7th International Workshop on Parsing Technologies*, Oct. 19, 2001, pp. 1-4.

A.Vinciarelli, S.Bengio, H.Bunke, Office Recognition of Unconstrained handwritten Texts Using HMMs and Statistical Language, *IEEE Transactions on Pattern Analysis and Machine Intelligence*, vol. 26. No. 6, pp. 709-720, Jun. 2004.

J.A.Rodriguez, *Segmentation Procedure for Handwritten Word Spotting*, Jul. 4, 2007, pp. 1-4.

\* cited by examiner

| CLIENT NAME: J. DOE | | | QUALITY PHOTO GUIDE |
| --- | --- | --- | --- |
| DATE: 01/01/08 | | | ALBUM "HOLIDAYS" |
| PAGE | | | GUIDELINE |
| # | THUMBNAIL | | |
| 1 | [image] | ☐ | FOREGROUND OBJECT WAS TOO DARK, CONTRAST HAS BEEN AUGMENTED LOCALLY IN THE OBJECT SURFACE. |
| | | | TIP USE YOUR FLASH WHEN YOU ARE SHOOTING IN DIRECT SUN LIGHT |
| 2 | [image] | ☐ | THE SNOW LOOKS UNNATURAL, COLOR BALANCE HAS BEEN APPLIED SO THAT THE SNOW IS WHITE. |
| | | | TIP WHEN SHOOTING WINTER IMAGES, DISABLE AUTOMATIC COLOR BALANCE AND TUNE IT MANUALLY. |
| 3 | [image] | ☐ | |
| | | | TIP |
| 4 | [image] | ☐ | |
| 5 | [image] | ☐ | |

FIG. 1

AUTOMATIC GENERATION OF A PHOTO GUIDE

This application claims the priority as a Continuation of U.S. application Ser. No. 12/049,520, filed Mar. 17, 2008, entitled AUTOMATIC GENERATION OF A PHOTO GUIDE, by Luca Marchesotti, the disclosure of which is incorporated herein by reference in its entirety.

CROSS REFERENCE TO RELATED PATENTS AND APPLICATIONS

The following copending applications, the disclosures of which are incorporated herein by reference in their entireties, are mentioned:

U.S. application Ser. No. 11/524,100, filed Sep. 19, 2006 (now U.S. Pat. Nos. 7,885,466 and 8,165,410), entitled BAGS OF VISUAL CONTEXT-DEPENDENT WORDS FOR GENERIC VISUAL CATEGORIZATION, by Florent Perronnin.

U.S. application Ser. No. 11/637,984, filed Dec. 13, 2006 (now U.S. Pub. No. 20080144068), entitled PRINTER WITH IMAGE CATEGORIZATION CAPABILITY, by Anthony Digby.

U.S. application Ser. No. 11/801,230, filed May 9, 2007 (now U.S. Pat. No. 7,898,696), entitled PRINT JOB AESTHETICS ENHANCEMENTS DETECTION AND MODELING THROUGH COMBINED USER ACTIVITY ANALYSIS AND CONTENT MATCHING, by Luca Marchesotti, et al.

U.S. application Ser. No. 11/767,739, filed Jun. 25, 2007 (now U.S. Pat. No. 7,933,454), entitled CLASS-BASED IMAGE ENHANCEMENT SYSTEM, by Marco Bressan, et al.

U.S. application Ser. No. 12/033,434, filed Feb. 19, 2008 (now U.S. Pat. No. 8,009,921), entitled CONTEXT DEPENDENT INTELLIGENT THUMBNAIL IMAGES, by Gabriela Csurka.

BACKGROUND

The exemplary embodiment relates to the field of image processing. It finds particular application in connection with the provision of feedback on the automated enhancement of digital images, and is described with particular reference thereto. However, it is to be appreciated that it may find more general application in image classification, image content analysis, image archiving, image database management and searching, and so forth.

Photographers are now using digital image capture devices, such as cameras, cell phones, and optical scanners, to capture images in digital format. The captured images are often sent to photofinishing services or content-sharing communities. Regardless of the final medium in which the images will be managed, shared and visualized, the quality expectations of users are growing. These services often make use of automated or semi-automated enhancement methods to correct detected degradations in an image. For example, features such as automatic color balance or red-eye correction are now standard components in many image editing applications. Acquisition conditions, user expertise, compression algorithms and sensor quality can seriously degrade the final image quality. Image enhancement tools attempt to compensate for this degradation by altering image features for subsequent analysis, distribution or display. Examples of these image features include contrast and edge enhancement, noise filtering for a wide variety of noise sources, sharpening, exposure correction, color balance adjustment, automatic cropping, and correction of shaky images. Traditional photofinishing services available online enable clients to enhance images manually or automatically through proprietary algorithms before printing however, no feedback is given to clients on the quality of the original images and on the effect of the applied enhancements in the final prints.

When the enhancements are performed automatically, without user input, the amateur photographer may not notice the enhancements without a close inspection of the finished product, and thus is often unaware that the photofinishing service has considerably improved the visual appearance of the image in the process. Moreover, the photographer does not appreciate that changes in shooting techniques could avoid similar image degradations in the future. Perceiving the quality of a digital image is in general a difficult exercise for non-expert users. In particular, it is not easy to spot specific degradations (e.g., low contrast vs. low saturation, incorrect white balance, and the like) or to understand how these degradations could have been avoided at the time the photo was taken.

INCORPORATION BY REFERENCE

The following references, the disclosures of which are incorporated in their entireties by reference, are mentioned:

U.S. Pub No. 20030151674, published Aug. 14, 2003, entitled METHOD AND SYSTEM FOR ASSESSING THE PHOTO QUALITY OF A CAPTURED IMAGE IN A DIGITAL STILL CAMERA, by Lin, discloses a method and system for assessing in-camera the photo quality of a captured digital image for the purpose of providing the digital still camera user with photo quality feedback.

U.S. Pub. No. 20070005356, published Jan. 4, 2007, entitled GENERIC VISUAL CATEGORIZATION METHOD AND SYSTEM, by Florent Perronnin, discloses techniques for classifying images based on class visual vocabularies constructed by merging a general visual vocabulary with class-specific visual vocabularies.

U.S. Pub. No. 20070258648, published Nov. 8, 2007, entitled GENERIC VISUAL CLASSIFICATION WITH GRADIENT COMPONENTS-BASED DIMENSIONALITY ENHANCEMENT, by Florent Perronnin, discloses an image classification system with a plurality of generative models which correspond to a plurality of image classes. Each generative model embodies a merger of a general visual vocabulary and an image class-specific visual vocabulary. A gradient-based class similarity modeler includes a model fitting data extractor that generates model fitting data of an image respective to each generative model and a dimensionality enhancer that computes a gradient-based vector representation of the model fitting data with respect to each generative model in a vector space defined by the generative model. An image classifier classifies the image respective to the plurality of image classes based on the gradient-based vector representations of class similarity.

U.S. Pat. Nos. 5,357,352, 5,363,209, 5,371,615, 5,414,538, 5,450,217; 5,450,502, 5,802,214 to Eschbach, et al., U.S. Pat. No. 5,347,374 to Fuss, et al., and U.S. Pat. No. 7,031,534 to Buckley disclose automated enhancement methods.

Csurka, et al., "Visual Categorization with Bags of Keypoints," ECCV International Workshop on Statistical Learning in Computer Vision, Prague, 2004, discloses a method for generic visual categorization based on vector quantization.

Perronnin, et al., "Adapted Vocabularies for Generic Visual Categorization," ECCV, 9th European Conference on Computer Vision, Graz, Austria, May 7-13, 2006, discloses methods based on a universal vocabulary, which describes the content of all the considered classes of images, and class vocabularies obtained through the adaptation of the universal vocabulary using class-specific data.

BRIEF DESCRIPTION

In accordance with one aspect of the exemplary embodiment, an automated method for generating an image quality guide document includes, for at least one image in a set of images undergoing image enhancement, identifying image quality-related features for the image based on enhancements being applied to the image, identifying image content-related features based on content of the image, determining a content-based degradation of the image based on the identified image quality-related features and image content-related features, and generating a thumbnail of the image. The method further includes generating an image quality guide document for the set of images in which at least one of the thumbnails is associated with a respective text description that is based on the determined content-based degradation.

In accordance with another aspect, an apparatus for generating an image quality guide document for a set of images includes an enhancement detector which outputs image quality-related features for images in the set based on enhancements being applied to the images. An image content analyzer outputs image content-related features for images in the set. A degradation classifier receives the output image quality-related features and image content-related features and outputs a content-based degradation for at least one of the images in the set. A thumbnail generator generates thumbnails for images in the set. An image quality guide document generator generates an image quality guide document for the set of images in which at least one of the thumbnails is associated with a respective text description that is based on the determined content-based degradation.

In accordance with another aspect, an image quality guide document rendered in tangible media includes an arrangement of thumbnails for a set of processed images and automatically generated associated text descriptions associated with at least some of the thumbnails, each text description describing a content-based degradation of the image and an image enhancement applied to correct the degradation.

In accordance with another aspect, an image processing method includes applying at least one image enhancement to at least one of a set of input images to generate a set of enhanced images. Image quality-related features for the at least one image based on the at least one applied enhancement are identified. Image content-related features are identified based on content of the at least one image. Thumbnails of the images are generated. An image quality guide document is generated for the set of images in which at least one of the thumbnails is associated with a respective text description that is based on the identified image quality-related features and image content-related features.

BRIEF DESCRIPTION OF THE DRAWINGS

FIG. 1 is an illustration of a portion of a photo guide in accordance with one aspect of the exemplary embodiment;

DETAILED DESCRIPTION

Figure 2:
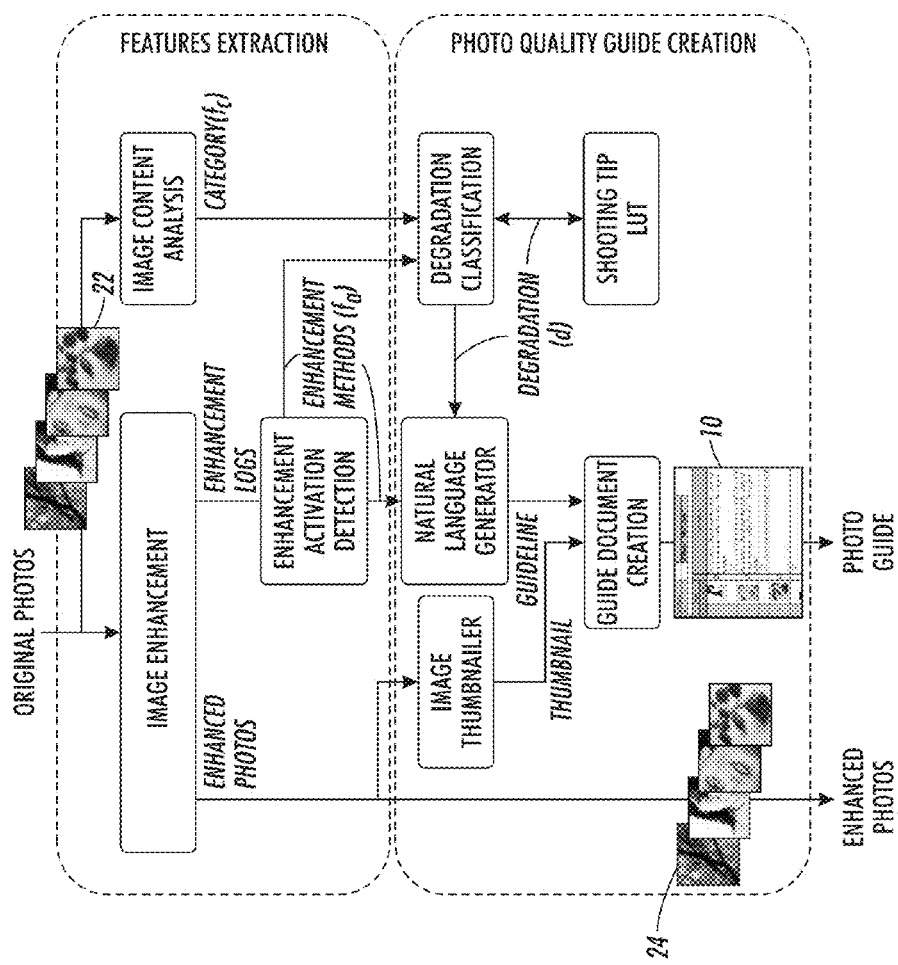
FIG. 2 schematically illustrates the generation of the photo guide of FIG. 1.

Aspects of the exemplary embodiment relate to a system and method for automatically creating an image quality guide document, particularly in the context of photo-finishing applications. The exemplary image quality guide document or "photo guide" is composed of thumbnails of images, together with accompanying text descriptions that are generated in a human readable form based on content-based image degradations. In the exemplary method, features describing the perceptual quality and content of a set of input images are extracted. Image degradations can be classified based on these features and related to eventual photo shooting tips through a look-up table.

A digital image includes image data for each pixel of a generally two-dimensional array of pixels. The image data may be in the form of gray scale values, where gray can refer to any color separation, or any other graduated intensity scale. While particular reference is made herein to the images being photographs, it is to be appreciated that other digitally acquired images, such as images acquired by an optical scanner, may be similarly processed.

FIG. 1 illustrates an exemplary photo guide 10 by way of example. The photo guide 10 may be a digital document or a hardcopy document which, for a set of processed images, identifies image quality degradations and/or the enhancement methods used to correct the degradations, and optionally provides tips for improving image capture techniques, with a view to assisting the user to avoid similar degradations in the future.

As will be appreciated, in the context of enhancements, not all image enhancement methods that are applied to an image result in what would be considered an improvement by an observer. Moreover, observers may differ in what is considered to be a visual improvement. However, for ease of description, all operations which are performed to correct an identified degradation will be referred to as enhancements, irrespective of whether they would be considered as such by an observer.

The guide 10 includes a set of thumbnail images 12, one for each of the images in a set of processed images. In general, each thumbnail image comprises image data derived from the respective image. Usually, the thumbnail image 12 contains less information than the original image. For example, each thumbnail image 12 may be a reduced resolution and/or cropped, digital image generated from the original image or processed original image. All of the thumbnails in the set may be the same size. In some embodiments, the image may be otherwise digitally modified in creating the thumbnail, for example by conversion from color to monochrome (e.g., a black and white thumbnail). In other embodiments, a representative portion of the image is automatically selected as the thumbnail, avoiding the need for reducing resolution or resizing. Indeed, the thumbnail can be any visual representation of the image which allows images to be distinguished from each other in the set. In one embodiment, the thumbnail is a context-dependent image, as described, for example, in above-mentioned application Ser. No. 12/033,434. In such an approach, the portion of the image selected as the thumbnail may be dependent on the context in which the image is to be used. For example, if the user is known to be interested primarily in faces, a region of the image can be identified with suitable face recognition software and used as a basis for determining a suitable crop area.

Associated with each thumbnail, e.g., adjacent thereto in the guide 10, is a text description 14, which serves as a guideline. The text description can be a phrase, sentence or other text string in a natural language, such as English. The text description, for an image which has undergone an automated image enhancement process, is derived from a determined content-based degradation for the original image, which is based on its perceptual quality and content based features. In the exemplary embodiment, the photo guide 10 is arranged in columns. A first column includes the set of thumbnails, arranged in the order in which the corresponding set of processed images is to be output. A second column includes the text description 14 for each thumbnail in the same order. Thus, each row includes a thumbnail and its associated text description (if one has been generated). Other methods of arranging the thumbnails 12 and text descriptions 14 are, however, contemplated. For example, the thumbnails may be arranged in a circle with text descriptions forming a corresponding inner or outer circle. Alternatively, lead lines may be used to associate the text descriptions with the respective thumbnails. Or, a numbering system or other unique identifiers may be used to associate thumbnails with corresponding text descriptions.

A shooting tip 16, which identifies an image acquisition technique for avoiding the determined content-based degradation in the future, is also associated with the thumbnail 12. In general, only those images which have undergone enhancement have an associated text description 14 and optionally also a shooting tip 16. In the case of a digital guide 10, the tip may open in another window when a tip icon 18 is actuated, e.g., by clicking on the icon. As for the text description, other ways of associating the shooting tip 16 with the corresponding thumbnail 12 are contemplated. In the exemplary embodiment, text descriptions 14 and the shooting tips 16 are both based on a determined degradation for the image. The degradation, in turn, is based on a content-based categorization of the image as well as image-quality related factors derived from information on applied enhancement(s), as described in greater detail below.

The photo guide 10 may further include identifying information 20. For example, the set of images may be identified according to a particular user, date, and title of the set (album title), or otherwise uniquely identified.

With reference now to FIG. 2, a brief overview of an exemplary process for generating a photo guide 10 of the type illustrated in FIG. 1 is shown. The process takes as input a set of original digital images 22 to be processed. The input images 22 undergo image enhancement and are output as a set of enhanced images 24, in either digital or hardcopy format. Thumbnails 12 are generated for the images. Image content analysis, together with information on the enhancement(s) applied, is used in degradation classification. The output degradation, as processed by a natural language generator, is used in the creation of the photo guide 10. A shooting tip look up table (LUT) generates shooting tips for the guide 10, based on the degradation classification. The guide 10, together with the enhanced images 24, are output, e.g., sent to a user.

As shown in FIG. 2, the exemplary method is divided into two stages: a features extraction stage and a photo guide creation stage. In the features extraction stage, image quality-related features $f_a$ are extracted, as well as image content-related features $f_c$. The image quality-related features $f_a$ may derived from information related to the enhancement applied to the image and/or a degradation on which the applied enhancement is based. The image content-related features $f_c$ are derived from an analysis of image content. Both these features are used in the photo guide creation stage for identifying a content-based degradation d for each enhanced image and optionally an associated shooting tip 16.

Figure 3:
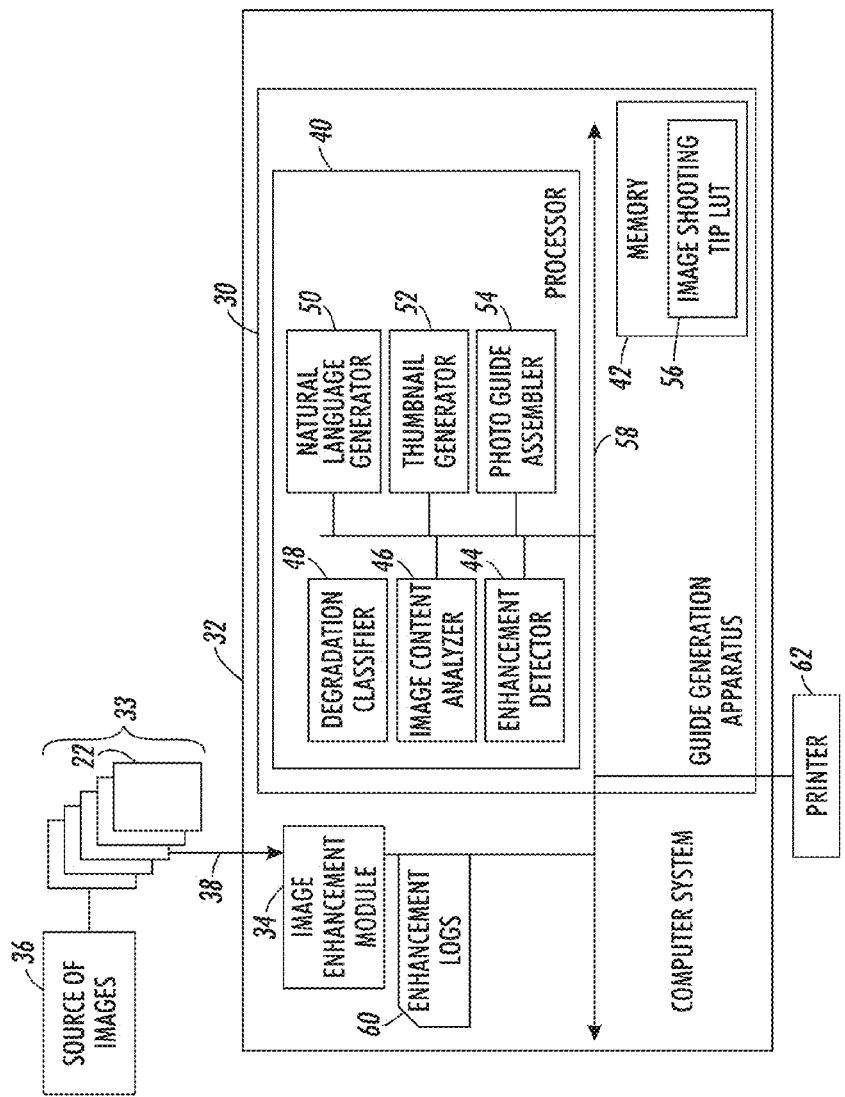
FIG. 3 is a functional block diagram of an apparatus for generation of a photo guide in accordance with another aspect of the exemplary embodiment.

FIG. 3 is a functional block diagram illustrating an image processing system in which an exemplary apparatus 30 for generating a photo guide 10 operates. The photo-guide generation apparatus 30 may be embodied in a computing device 32, such as a general purpose computer, server, or other dedicated computing device. A set 33 of digital images 22 to be processed is input to an image enhancement module 34, which may be resident on the computing device 32, as shown, or communicatively linked thereto. In general, given an input image, the image enhancement module 34 improves the perceptual quality by applying combinations of enhancement methods (e.g., one or more corrections for sharpness, color balance, saturation, global contrast, local contrast, noise, and the like). The enhancement module 34 may execute automated techniques for image enhancement in order to generate a set of enhanced photographs 24. In general, the enhancement module 34 determines whether an image warrants an enhancement and applies one or more selected enhancements, as appropriate, to each image 22. Of course, for any given set of images, one or more, or even all of the images 22 may undergo no enhancement if the enhancement module 34 determines that no enhancement is needed. The enhancement module 34 may be embodied in hardware, or software or both. In the exemplary embodiment, the enhancement module 34 includes a processor which executes instructions stored in associated memory for identifying image quality related parameters and for performing enhancements which modify these parameters.

The images 22 may be input to the image enhancement module 34 from a source of digital images 36, such as a personal computer, memory storage device, digital image acquisition device, such as a camera or scanner, or the like. In the exemplary embodiment, the source 36 of digital images is linked to the computing device by a wired or wireless link 38, such as a local area network or a wide area network, such as the Internet.

The exemplary photo-guide generation apparatus 30 may be embodied in software, hardware or a combination of both. In the exemplary embodiment, the apparatus 30 includes a processor 40 (which executes instructions stored in associated memory 42 for performing the exemplary method disclosed herein. Processor 40 may be the same processor as used for the enhancement module 34 or a different processor. The processor 40 includes/executes various processing components, which may be separate modules, including an enhancement detector 44, an image content analyzer 46 a degradation classifier 48, a natural language generator 50, a thumbnail generator 52 and a guide assembler 54. The processor 40 accesses a shooting tip LUT 56, which may be stored in memory 42. The processing components 44, 46, 48, 50, 52, 54 of the apparatus and memory 42 may communicate via a data/control bus 58.

The memory 42 may represent any type of computer readable medium such as random access memory (RAM), read only memory (ROM), magnetic disk or tape, optical disk, flash memory, or holographic memory. In one embodiment, the memory 42 comprises a combination of random access memory and read only memory. In some embodiments, the processor 40 and memory 42 may be combined in a single chip. In one embodiment, memory 42, or separate memory, stores instructions for performing the exemplary method as well as providing temporary storage for input images and the processed images.

The operation of each of the processing components 44, 46, 48, 50, 52, and 54 will be best understood with reference to the method, discussed further below. Briefly, the enhancement detector 44 determines which enhancement method has been applied to a given image. In the exemplary embodiment, the detector 44 receives a record of the enhancements performed on the original images. This record may be in the form of enhancement logs 60 that are output from the image enhancement module 34. From these records 60, image quality-related features $f_a$ describing the perceptual quality (degradation) of the images and/or the enhancements applied to the image by the enhancement module 34 are identified.

The image content analyzer 46 analyzes the image 22 according to its visual content. In general, the analyzer 46 provides generic descriptions about the visual content of the input images according to a predefined set of visual categories. In one embodiment, the analyzer 46 extracts image-content content-based features $f_c$ from the image 22. The analyzer 46 may include a classifier (or set of classifiers) which has/have been trained on a training set of images. The training images have been manually categorized according to their image content and thus a probability model can be developed which allows new images to be classified according to their identified features. In one embodiment, the analyzer 26 includes a set of binary classifiers which each classify the image for one of the visual categories (i.e., as being a member of a visual category or not) based on an identified set of image content-based features $f_c$. In another embodiment, the analyzer 46 outputs, for each of a set of categories, a probability that the image is in that category, based on the identified set of image content-based features $f_c$.

The set of visual categories can include, for example, categories which a typified by different shooting problems, such as "winter" (problems with reflections from snow), "indoors" (problems resulting from poor lighting), "portraits" (illumination problems leading to problems in correctly matching skin color of people, redeye problems, etc.), "landscapes" (problems of overexposure), "seascapes," including beach scenes (problems in capturing moving water as well as overexposure problems), "urban" (problems with contrast between dark buildings and sky), "night lights" (problems with noise and contrast), "flowers" (problems with saturation), and the like. As will be appreciated, the number and types of categories, and optionally sub-categories of these categories, used in generating the image content features are not limited and may vary, for example, depending on the types of images being processed.

The degradation classifier 48 determines the degradation affecting the image 22 by taking into account image content features $f_c$ output by the analyzer 46 and image quality related features $f_a$ based on the applied enhancements. The degradation classifier 48 receives, as input, the features $f_a$ and $f_c$ and outputs a content dependent degradation d for the image which is a function of both the extracted image content features $f_c$ and image quality related features $f_a$.

The natural language generator 50 generates a text description in human readable form, based on the applied enhancements $f_a$ and assigned degradation d which will serve as part of the text description 14 for that image 22. In particular, it assembles in a human readable sentence (photo guideline) the photo degradations, the applied enhancements. The generator also generates one or more shooting tips 16 by accessing the LUT 56.

The thumbnail generator 52 generates a thumbnail image, based on the original or processed image 22. In one embodiment, the thumbnail is generated by reducing the size and optionally also reducing the resolution of the original or enhanced image. Typically the thumbnail is about 2-3 cm in its largest dimension so that a group of at least about 6-10 of the thumbnails 12 can be arranged in a column on a single page of the photo guide 10.

The shooting tip LUT 56 is a look-up table or other data structure that relates degradation d to suggestions (tips) on how to avoid degradation affecting the images. The exemplary LUT 56 stores shooting tips indexed by degradation classification d. Each degradation classification may be linked, in the LUT, to one or more associated shooting tip 16.

The guide assembler 54 assembles the image thumbnails 12 and associated text descriptions 14 and shooting tips 16 for the set 33 of images, to form the photo guide 10. The guide 10 may be output in tangible media. The tangible medium may be a hardcopy document or a data storage device on which the guide is stored, such as a disk, memory stick, or the like. For example, the guide 10 may be output to a rendering device 62, to be rendered in hardcopy. The rendering device 62 may be a printer which prints the guide 10 on a suitable print material, such as copy paper or photo-quality paper. Printer 62 may be the same device which prints the photographs 24, or a separate device. Alternatively, the guide 10 may be output in electronic form.

Figure 4:
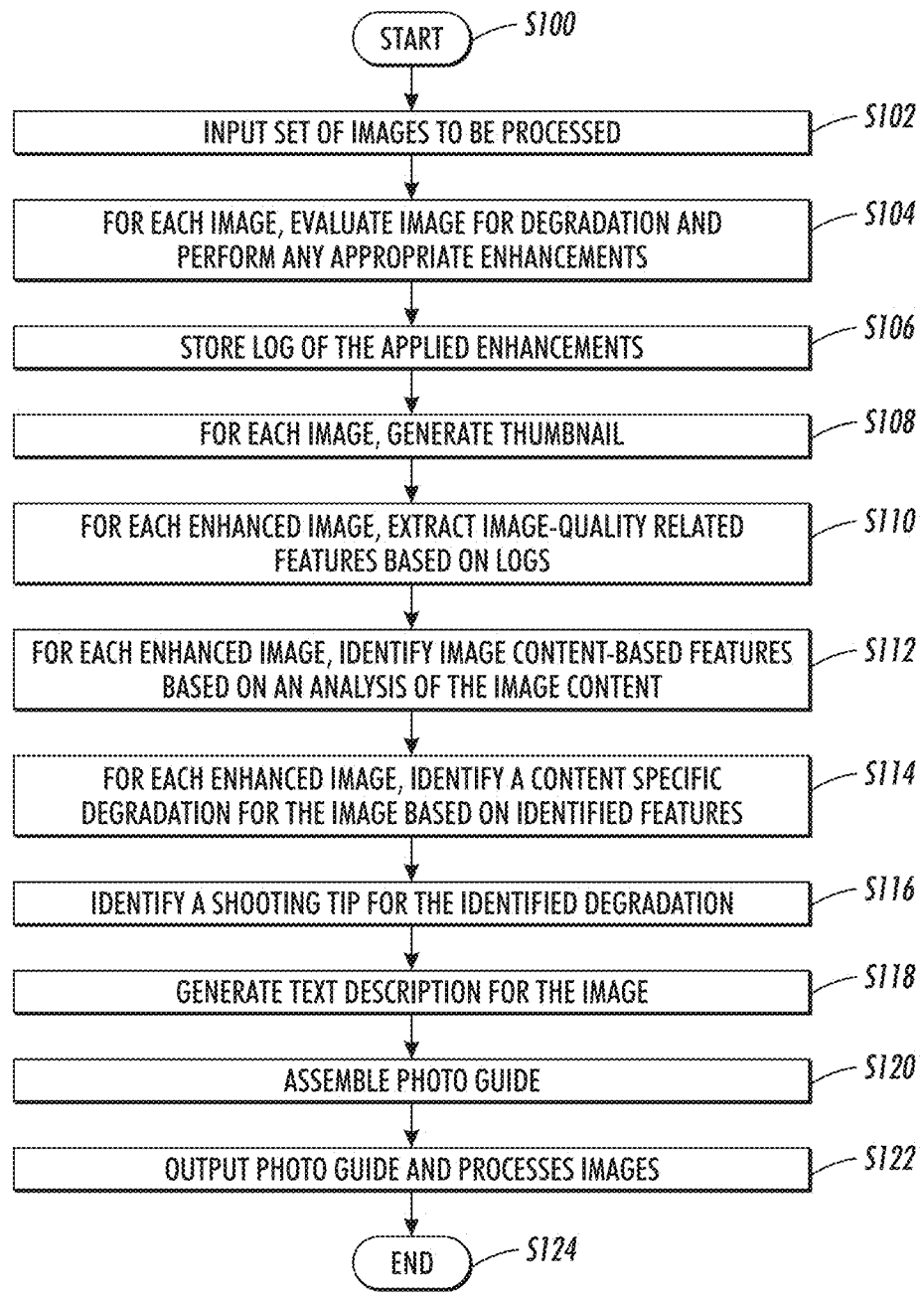
FIG. 4 illustrates steps in a method for generation of a photo guide in accordance with another aspect of the exemplary embodiment.

FIG. 4 illustrates an exemplary method for generating a photo guide 10. As will be appreciated, some of the steps described may take place contemporaneously or in an order different from that described. The method begins at S100.

At S102, a set 33 of images is submitted for processing. A print shop operator may receive the set 33 of images to be printed from a specific client via e-mail, file transfer protocol (FTP) upload, CD Rom, DVD, or any other optical medium, a RAM, a PROM, an EPROM, a FLASH-EPROM, USB key, or other memory chip or cartridge, through the use of workflow management tools such as Press Sense's iWay™, or through a web interface to which a customer inputs a request via a web browser. Where a customer makes use of a web portal for submission of the images, various data may be associated with the images, such as the customer ID, date, number of images, type of job, and the like. In other formats, a request form associated with the images may provide some or all of this information.

At S104, for each image 22 in turn, the image is automatically evaluated by image enhancement module 34 and enhancements appropriate to any determined degradations are applied.

At S106, a log 60 containing information concerning the applied enhancements is received from the image enhancement module and stored, e.g., in memory 42.

At S108, a thumbnail 12 is generated for each image and may be temporarily stored in memory 42.

At S110, for each image which is being enhanced, image quality features $f_a$ are identified, based on the logs 60 of applied enhancements.

At S112, for each enhanced image, image content features $f_c$ are identified. This step may be automatically performed for all images or only for those images for which an enhancement has been applied.

At S114, for each enhanced image, a content-based degradation d is determined for the image, based on the image quality and content features $f_a$ and $f_c$.

At S116, a shooting tip may be identified for the degradation d.

At S118, a text description 14 is generated, based on the enhancement method and/or identified degradation. The text description 14 may be a sentence, phrase, or multiple sentences. The text description may briefly describe the identified degradation, the image enhancement method used and the intended result.

At S120, the image thumbnail 12, text description 14 and shooting tip(s) 16 for each enhanced image 24 are assembled into the photo guide 10. In one embodiment, the thumbnails of all images in the set 33 are included in the photo guide, with the text description left blank for the unenhanced images, or otherwise configured to indicate such images as having not undergone enhancement. Additional information may be incorporated into the photo guide, such as user name, job title, date, and other identifying information 20.

At S122, the completed guide 10 is output. The guide may be rendered in tangible media, such as by printing on paper, or stored in digital form. The printed enhanced images 24 and printed guide 10 may be packaged together and shipped to a customer and/or sent to the customer in electronic form.

The method ends at S124, and may be repeated for each new set 33 of images to be processed.

The method illustrated in FIG. 4 may be implemented in a computer program product that may be executed on a computer. The computer program product may be a tangible computer-readable recording medium on which a control program is recorded, such as a disk, hard drive, or may be a transmittable carrier wave in which the control program is embodied as a data signal. Common forms of computer-readable media include, for example, floppy disks, flexible disks, hard disks, magnetic tape, or any other magnetic storage medium, CD-ROM, DVD, or any other optical medium, a RAM, a PROM, an EPROM, a FLASH-EPROM, or other memory chip or cartridge, transmission media, such as acoustic or light waves, such as those generated during radio wave and infrared data communications, and the like, or any other medium from which a computer can read and use.

The exemplary method may be implemented on one or more general purpose computers, special purpose computer (s), a programmed microprocessor or microcontroller and peripheral integrated circuit elements, an ASIC or other integrated circuit, a digital signal processor, a hardwired electronic or logic circuit such as a discrete element circuit, a programmable logic device such as a PLD, PLA, FPGA, or PAL, or the like. In general, any device, capable of implementing a finite state machine that is in turn capable of implementing the flowchart shown in FIG. 4, can be used to implement the method for generating a photo guide.

Various aspects of the exemplary apparatus and method will now be described in greater detail.

Image Enhancement

The image enhancement module 34 may comprise an automated Image Enhancement (AIE) module, as described, for example, in U.S. Pat. Nos. 5,357,352, 5,363,209, 5,371,615, 5,414,538, 5,450,217; 5,450,502, 5,802,214, 5,347,374, and 7,031,534, incorporated by reference, and made available in certain applications such as Xerox's FreeFlow™ DocuSP™ software suite and in Xerox's FreeFlow™ Process Manager software, which is part of Xerox's FreeFlow™ Digital Workflow Collection.

In general, the enhancement module 34 automatically evaluates a number of image quality features for an input image to determine whether the image meets predetermined acceptable values for these features (which may be expressed in terms of threshold values, ranges, or the like). Exemplary image quality features for determining whether an enhancement should be applied may be selected from: image contrast values, saturation, exposure, color balance, brightness, background color, red eye detection, and combinations thereof. These features may be assessed globally (over the entire image) or locally, allowing different regions of an image to be enhanced differently.

Techniques for determining these features are described, for example, in the above-mentioned patents, and may include generating statistics such as noise measures or luminance and chrominance distributions on a low resolution version of the image. U.S. Pat. No. 5,414,538, for example, incorporated herein by reference, discloses receiving the input image defined in terms of red-green-blue (RGB) signals, converting the RGB signals to corresponding luminance-chrominance signals including at least one signal that represent overall image intensity, and comparing the intensity signal to upper and lower intensity threshold signals that define the acceptable levels of brightness and darkness in the image. At the decision stage, if one of the thresholds is exceeded, the image signal representative of image intensity is processed according to a select equation, and a TRC associated with the image is adjusted so that exposure characteristics of the resulting output image are perceived to be superior to those of the input image. Similar techniques for luminance are described in U.S. Pat. No. 5,450,502, incorporated by reference.

Exemplary enhancement methods include sharpening, exposure correction, color balance and saturation adjustment, contrast and edge enhancement, blocking artifact reduction, and noise reduction. Other enhancements are focused on specific problems, such as red-eye correction, automatic cropping, or glass glare removal.

Sharpness refers to the presence of crisp edges and fine details in an image. Techniques for sharpening often use filters, which may be applied locally or globally. Exposure refers to the average of the global distribution of intensity along the dynamic range of the image. Making the image darker or lighter can bring details from the shadows or give depth to the colors of the photograph. The automatic setting of exposure, a feature present in most digital cameras, can yield unrealistic results and exposure correction attempts to overcome this problem. One approach to correcting exposure is to apply gamma correction to the image intensity. For example, the gamma parameter may be determined automatically from the histogram of the input image.

Color balance or white balance is the process of adjusting the colors to resemble perceptual response and is generally a global enhancement. The human visual system ensures the perceived color of objects remains relatively constant under varying illumination and reflectance conditions, e.g., color constancy. When imaging devices are tailored to common illuminants, e.g., D65, they can introduce strong color casts when the scene has another light source. In one approach to color balance, the average chrominance on any given image is assumed to be approximately gray. In another approach, it is assumed that a specular surface on the image will reflect the actual color of the light source. Other closely related approaches which may be employed are white point and black point approaches.

Saturation refers to the vividness of colored objects in an image. A color with more gray is considered less saturated, while a bright color, one with very little gray in it, is considered highly saturated. The saturation of a color can affect the emotional reaction to an image. Colors that have low saturations are often seen as dull and boring, but can also be thought of as restful and peaceful. Highly saturated colors, on the other hand, are more vibrant and emotionally aggressive. In conventional automatic enhancement approaches, where neither the image content nor the user's intent is known, the system detects and modifies the extremes of color saturation to bring the image saturation to a generally acceptable level. An alternative to the direct modification of the saturation value in HSV space, is to interpolate or extrapolate between the original image and a black-and-white version of the image. Such techniques tend to be rather conservative as user preferences for saturation enhancements often depend on the semantic content of the image. In one embodiment, an intent-based enhancement system is used, in which color saturation enhancement modes are selected by a model with a view to reproducing the user's intent by factoring in the class of the image (e.g., "snow", "buildings", or "seascape," etc.), as disclosed, for example, in above-mentioned application Ser. No. 11/767,739. Thus, the level of enhancements need not be as conservative, for some of the classes, as conventional techniques.

Contrast refers to the efficient use of the dynamic range. Conventional contrast enhancements aim to make image details more evident to a human observer. In the exemplary intent-based system, this is not necessarily so, depending on the class. Contrast enhancement can be achieved via global approaches or local approaches, e.g., through tone reproduction operators (TROS) (See, for example, Marco Bressan, Christopher R. Dance, Herve Poirier, and Damian Arregui. Local Contrast Enhancement. IS&T/SPIE Symposium on Electronic Imaging, San Jose, Calif., USA, 28 Jan.-1 Feb. 2007). Optionally, enhancements may employ generative models to recover the reflectance which may be lost, using edge preserving filters to avoid halo effects.

Blocking artifacts are the result of coding, resizing or compressing the image. One approach to reducing blocking artifacts is to low-pass filter the pixels directly adjacent to the block boundaries. Other techniques, which may be useful in the exemplary system may employ a Gaussian spatial domain filter, linear block boundary filters, anisotropic Gaussian filters perpendicular to the block boundary, edge preserving space-variant region-based filters, wavelet transform to smooth blocking effects while preserving edges, and combinations thereof. Techniques may be employed for estimating the blockiness of an image to adjust the level of correction, and avoid unnecessary degradation.

Noise can result from imperfect instruments, problems with the data acquisition, transmission and compression, and other sources of noise on the image. Random image noise corresponds generally to visible grain or particles present in the image which are generally caused by the electronic noise in the input device sensor and circuitry (e.g., scanner, digital camera). Intensity spikes speckle or salt and pepper noise will only affect a small number of image pixels. They are caused by flecks of dust on the lens or inside the camera, dust or scratches on scanned photography or film, faulty CCD elements, "hot pixels" occurring with long exposures with digital camera, etc. Banding noise can be introduced when the data is read from the digital sensor (e.g., scanner streaks) and scratches on the film will appear as additional artifacts on the images. Exemplary enhancements aimed at removal of noise which may be utilized herein may include convolving the original image with a mask (e.g., Gaussian); use of median filters for removing salt and pepper noise while preserving image detail, or use of a wavelet, anisotropic diffusion, or bilateral filtering techniques, and combinations thereof.

Image blur is a form of bandwidth reduction typically caused by relative motion between the camera and the original scene or by an optical system that is out of focus. It can affect the totality or part of an image and many cameras today have built in solutions to stabilize image capture. Exemplary enhancements aimed at reducing image blur which may be utilized herein include methods for solving the restoration problem from blind de-convolution, approaches that combine power-laws with wavelet domain constraints, methods for removing the specific blur due to camera shake, and combinations thereof. Automatic implementation of such techniques may include the estimation of the level of blur or motion blur for the different image regions, prior to correction.

In one embodiment, the automated enhancement may be a class based enhancement as described, for example, in U.S. application Ser. No. 11/767,739, by Marco Bressan, et al., the disclosure of which is incorporated by reference. In this embodiment, the automated enhancement module 34 takes as input the class to which an image has been assigned, as output by the analyzer 46. Other enhancement techniques which may be applied are discussed in the Ser. No. 11/767,739 application.

It is to be appreciated that the exemplary apparatus and method are not limited to any particular type of automated image enhancement method. For generating features $f_a$, some record which allows a determination of which enhancements from a set of possible enhancements have been actuated (applied) and/or the image quality parameters which lead to the actuation is generally sufficient.

Image Enhancement Detection and Image Quality Features Identification

Step S110 may include detection of applied enhancements and a level at which the enhancement is applied, for example, by keyword searching in the logs 60 generated by the automated enhancement module 34. The keywords are used to identify words known to be used by the enhancement module 34 in connection with a particular enhancement method. For example, in the case of local contrast, the log may report "performing LCE correction."

For each enhancement method employed by the enhancement module 34, an activation threshold is defined. The activation threshold specifies a minimum or maximum value or range for an identified image quality parameter that actuates the enhancement. If the threshold is met, the enhancement is considered to have been applied, for purposes of identifying the image quality features. The activation threshold may be set such that minor enhancements can be ignored for purposes of identifying the image quality features.

Thus for example, where the enhancement is related to "noise," and an image quality parameter (noise parameter) having a value greater than a threshold value, such as 0.0 is obtained, the noise enhancement is considered to have been applied. Similarly, for "sharpness," the image quality parameter may be an edge factor with a threshold of less than, for example, 1. If this threshold is satisfied, sharpness is considered to have been enhanced. If the threshold is not satisfied, i.e., when an edge factor of greater than 1 is detected, a sharpness enhancement is considered not to have taken place, even though some correction may have been applied by the image enhancement module 34. For color balance, any variation in the black and white points may be used to specify the color balance as being enhanced, and so forth. Each of the features $f_a$ may be based on an enhancement method and a corresponding level at which the enhancement is applied. The level may be binary, e.g., 1 for applied (at least meeting the threshold) or 0 for not applied (does not meet the threshold). Or the features may allow for more specific quantification of the extent of enhancement, such as values which can vary between a maximum and minimum value, such as between 0 and 1.

A features vector comprising the set of features $f_a$ may be generated. Each of the set of enhancement methods may be assigned a unique identifier, such as a number or other ID. The vector may be indexed according to the enhancement ID, and includes the level of activation detected for each enhancement method. For example, a binary vector may include one value for each of seven enhancements, such as [0, 1, 1, 0, 0, 0, 0] indicating that only the second and third enhancements have been applied at a level which at least meets the respective threshold.

Image Content Analysis and Identification of Image Content-Related Features

Image content analysis (S112) may be performed by any suitable technique which allows images to be categorized based on image content. In the exemplary embodiment, it is assumed that image quality and image content are independent: i.e., image quality features $f_a$ are not considered in determining image content features $f_c$. In other embodiments, image quality may be considered in assigning image content features.

In one embodiment, the analyzer 46 comprises a generic type of visual classifier, such as the Xerox Generic Visual Classifier (GVC). Such a classifier labels patches (small regions) of an image based on semantic content, for example, by generating low level features, such as a features vector, one for each patch. Based on the extracted low level features, image content features $f_c$ for the image are identified. Each of the image content features $f_c$ may relate to a specific one of a set of image content categories (such as winter, indoors, portraits, landscapes, seascapes, urban, night lights, flowers, and the like).

The analyzer 46 may be trained on a training set of images which have been manually assigned to one or more of the set of predefined image content categories, based on their perceived image content, and whose low level features have been computed. The trained analyzer 46 may output a features vector based on the image content features $f_c$. The vector may be generated in a similar manner to the image quality vector output by enhancement detector 44, with each feature $f_c$ being indexed according to a unique ID. In other embodiments, the analyzer 46 outputs a single, most probable, category for each image in the set of images, which constitutes the image content features $f_c$.

Exemplary categorization techniques which may be used herein are to be found in U.S. application Ser. No. 11/524,100, by Florent Perronnin, and U.S. Pub. Nos. 20070005356 and 20070258648, the disclosures of all of which are incorporated herein in their entireties by reference. In general, these categorization techniques based on image content may encompass a set of operations that transforms pictorial inputs into commonly understood descriptions. Automated techniques have been developed which assign keywords to an image based on its high-level content. These techniques can analyze the whole scene or focus on objects within the image. Keyword assignment may be associated with a confidence value. The image is then labeled with keywords for which the confidence value exceeds a threshold confidence value. The most common tasks are recognition, classification, or detection. Recognition concerns the identification of particular object instances. Object and scene classifications are the tasks of assigning one or more general tags to an image. Detection is the problem of determining if one or more instances of an object occur in an image and, typically, estimate locations and scales of the detected instances.

In some multi-class categorization systems, statistical models are used to learn a sort of dictionary between individual image blobs (segments) and a set of predefined keywords.

In one embodiment, the classification includes a bag of visual word (BOV) based approach. In this approach, the image is first characterized by a histogram of visual word counts. The visual vocabulary is built automatically from a training set of images. To do this, some image descriptors are extracted from the image. Those descriptors are generally based on texture, color, shape, structure, or their combination and are extracted locally on regions of interest (ROI). The ROI can be obtained by image segmentation, by applying specific interest point detectors, by considering a regular grid, or by or simply random sampling of image patches. For example, Scale Invariant Feature Transform (SIFT) descriptors may be computed on each region.

For examples of each of these approaches, see, e.g., Csurka, G., Dance, C., Fan, L., Willamowski, J., and Bray, C., "Visual Categorization with Bags of Key-points," in *ECCV Workshop on Statistical Learning for Computer Vision* (2004); Quelhas, P., Monay, F., Odobez, J.-M., Gatica-Perez, D., Tuytelaars, T., and Gool, L. V., "Modeling Scenes with Local Descriptors and Latent Aspects," in *ICCV* (2005), and Carbonetto, P., de Freitas, N., and Barnard, K., "A Statistical Model for General Contextual Object Recognition," in *ECCV* (2004).

All features extracted are then mapped to the feature space and clustered to obtain the visual vocabulary. Often a simple K-means is used, however Gaussian Mixture Models (GMMs) (see, Perronnin, F., Dance, C., Csurka, G., and Bressan, M., "Adapted Vocabularies for Generic Visual Categorization," in *European Conf. on Computer Vision*. (2006)) can also be used to obtain a soft clustering, in-line with the continuous nature of visual words.

Given a new image to be classified, each feature vector is assigned to its closest visual word in the previously trained vocabulary or to all visual words in a probabilistic manner in the case of a stochastic model. The histogram is computed by accumulating the occurrences of each visual word. Finally, the histogram is fed to a set of classifiers, for example K nearest neighbor, probabilistic latent semantic classifiers (see, Bosch, A., Zisserman, A., and Munoz, X., "Scene Classification via pLSA." in *ECCV* (2007); Quelhas, P., Monay, F., Odobez, J.-M., Gatica-Perez, D., Tuytelaars, T., and Gool, L. V., "Modeling Scenes with Local Descriptors and Latent Aspects," in *ICCV* (2005)) or support vector machines (see, Csurka 2004). The output of these classifiers may be an overall category label $f_c$ for the image or several category labels $f_c$ for the image.

The exemplary analyzer 46 may include a bag of visual words (BOV)-based multi-label categorizer of the type described above, which has been trained on a large group of representative images (training images) that have been manually assigned to one (or more) of the set of categories (Urban, Portrait, Flowers, Interiors, Landscape, Snow, and Sky) by an observer. These categories tend to be representative of images found in typical imaging scenarios, although other categories may be selected or fewer or more categories used. Above-mentioned application Ser. No. 11/524,100 to Perronnin, et al. for example, discloses other details of exemplary categorizers of this type which may be used. In other approaches, an image can be characterized by a gradient representation in accordance with the above-mentioned application Ser. No. 11/418,949, incorporated herein by reference. In other embodiments, Fisher kernels may be used to identify the low-level features.

Though most of the mentioned approaches use a single visual vocabulary generally built on the whole training set, in other embodiments, performance may be improved by adapting the visual vocabulary (universal) trained on the whole training set to each category using category-specific images. An image is then characterized by a set of bipartite histograms, one per category, where each histogram describes whether the image content is best modeled by the universal vocabulary, or the corresponding category vocabulary. Such a method is described in application Ser. No. 11/170,496 to Perronnin, incorporated herein by reference.

As will be appreciated other methods of image content analysis and automated identification of the image content related features therefrom may be employed, singly or in combination, as described for example in U.S. application Ser. Nos. 11/801,230 and 11/767,739.

Determination of Content-Based Degradation

The content-based degradation d is based on both visual content and enhancement/degradation, i.e., two images which are similarly enhanced but have different content will be accorded a different degradation d. The determination of the degradation d for an image may include concatenating the identified image content features $f_c$ and image enhancement features $f_a$ for the image 22 that are output by the image content analyzer 46 and enhancement detector 44, respectively. For example, a features vector output by the enhancement detector 44 is concatenated together with a features vector output by the image content analyzer 46. This concatenated vector $f_d$ is input to the degradation classifier 48, which outputs a content-based degradation d for the image based thereon. The classifier 48 may have been trained on a large pool of images which have been manually classified according to degradation. Such a classifier may employ support vector machines (SVM), Neural Networks, or other learning models in the learning.

In one exemplary embodiment, the classifier 48 outputs a single content-based degradation d for the image, drawn from a finite set of content-based degradations. The output degradation d may be the degradation which is determined by the classifier 48 to be the most probable degradation. In other embodiments, multiple degradations may be output, which are ranked according to their assigned probabilities.

In other embodiments, where the enhancement detector 44 and analyzer 46 both output a single enhancement and category, respectively, the degradation classifier 48 may employ a look up table or other data structure to identify the content based degradation, rather than a trained classifier. Each degradation class d may be identified by a unique identifier, such as a number, for retrieving related shooting tip(s) from the LUT 56.

Natural Language Generator

The natural language generator 50 translates the degradation information into a human readable format. The natural language generator may simply retrieve a phrase or sentence from memory which corresponds to the class-based degradation d. In general, each retrieved description refers to an image degradation related to an object which is specific to an image category. For example, for images categorized as "winter", the description may refer to the object "snow," such as "snow looks blue." For portraits, the descriptions may relate to objects such as "faces," "red eyes," and the like.

In one embodiment, this description is supplemented with an explanation of image quality improvement (enhancement) performed. This enhancement description may be derived from the image quality features $f_a$. In some embodiments, the generator 50 may apply natural language processing techniques which check the fluency of the overall generated text description.

Shooting Tip Look Up Table

The LUT 56 may include one or more tips 16 for each degradation d. For example, when a photo guide 10 is known to have been generated for a particular customer previously, and the same degradation d is identified again, or the same degradation reappears in the same photo guide, the LUT 56 may output a different shooting tip which explains the shooting technique in a different way, or in more detail, or provides other information not previously provided. Alternatively, the shooting tips for a given degradation may each provide a different technique for correcting the degradation. Since cameras often have different functions, a user may not be able to implement a proposed shooting tip 16 on the user's camera. In one embodiment, the shooting tip is camera specific. For example, the camera make and model can be retrieved from metadata associated with the image or from information provided by the user and used to retrieve camera make/model specific shooting tips.

The exemplary embodiment finds application in the context of web-based photofinishing services and or content-sharing communities. The method and system may also find application in the context of an image enhancement program for personal computers.

One advantage of the photo guide 10 is that it allows the provider of photofinishing or other image processing services to demonstrate the added value of the service by emphasizing, using the customers own images, the sophistication of the image enhancement techniques used and the differences such techniques provide over what the customer could achieve by printing the photos without the image enhancement techniques. Another advantage is that is provides a service to customers by identifying techniques for avoiding image degradation in the future and thus improving image quality, since image enhancement techniques, in general, are not a complete substitute for shooting high quality images which need no enhancement. This allows end users to make better use of sophisticated image capture devices having an array of features, without needing to know how all the features operate, since the shooting tips focus on the types of photographs the user is particularly interested in capturing. By providing feedback on the utilization of AIE to print shop clients, the clients' overall satisfaction can be improved. Another advantage is that it allows unsophisticated users to participate in fully automated photo print-flows.

Without intending to limit the scope of the exemplary embodiment, the following example describes an exemplary implementation of the disclosed system and method.

Example

In this implementation of the environment and methodology illustrated in FIGS. 3 and 4, Xerox AIE (Automatic Image Enhancement) and GVC (Generic Visual Categorization) are used as image enhancement and content analysis modules 34, 46, respectively.

AIE module 34 generates enhanced versions of input images 22 and log files 60 containing information on seven enhancements (these are sharpness, color balance (white point and black point), saturation, contrast, local contrast, noise etc.) that can be applied. Table 1 illustrates AIE enhancement methods taken into account for the image quality analysis and activation threshold for a given image quality parameter or parameters used to determine the related feature. The observed range is given as an example of typical values observed in a pool of images. The ID is used as the index for the features vector. The enhancement activation detection module 44 determines, according to the threshold values given in Table 1, a feature vector $f_a$ indicating the level of activation of each specific enhancement.

TABLE 1

| ID | ENHANCEMENT METHOD | ACTIVATION THRESHOLD | OBSERVED RANGE |
|---|---|---|---|
| 0 | Noise | >0.0 | — |
| 1 | Sharpness | <1.0 | 0.577-3.059 |
| 2 | Color Balance (white point) | ≠0.0 | 0.000-2.000 |
| 3 | Color Balance (black point) | ≠0.0 | 0.000-2.000 |
| 4 | Saturation | ≠1.0 | 1.0-2.000 |
| 5 | Exposure | >1.0 | 1.000-2.000 |
| 6 | Global contrast | >0.0 | 0.000-2.000 |
| 7 | Local contrast | >0.0 | — |

The GVC 46 categorizes the set of images according to a predefined set of trained categories (e.g., winter, beach, portraits, night lights, landscape, flowers, urban) and it outputs the results in $f_c$.

The photo guide 10 presents in a document containing thumbnails of input images, guidelines in a human readable format according to a general template as illustrated in the example below:

| DEGRADATION+ | CORRECTION+ | SHOOTING TIP |
|---|---|---|
| Snow has a bluish color cast | Color balance is applied | Deactivate automatic white balance when shooting snow |

In the structure of the image guideline, the photo degradation is related to an explanation of image quality improvement (correction) and to a suggestion (shooting tip) on how to avoid the corrected degradation. The degradation and correction components may be formulated as a sentence, e.g., "Snow has a bluish color cast; color balance is applied to make the snow whiter."

The degradation classification module 48 is represented by a classifier (e.g., support vector machines (SVM), Neural Network, etc.) utilizing the features vector $f_d=[f_c,f_a]$, that can be trained to determine the image degradation d based on $f_d$. Table 2 shows a list of candidate degradation classes which may be deduced from the features vector. The degradation list is non-exhaustive and can be expanded to accommodate more specific classes. Each degradation d can eventually be associated to a shooting tip (i.e. suggestion on how to avoid the degradation at shooting time) through a static look-up table.

The classified degradation d and the list of applied corrections (enhancements) are then assembled into simple human readable sentences (photo guideline) through natural language generation techniques. Image thumbnails are extracted by shrinking the size of the input images to a fixed dimension. The photo guide assembler module 54 merges the thumbnails, and the guidelines by arranging them in a pre-defined document template.

Table 2 illustrates an exemplary Look-up table 56, relating degradation classes to shooting tips.

TABLE 2

| d | Degradation | Shooting Tip |
|---|---|---|
| 1 | Dark foreground object | Use Flash Outdoor to brighten up faces |
| 2 | Blurred foreground object | — |
| 3 | Red Eyes | Increase distance between camera and subject. |
| 4 | Snow looks blue | Use color balance to whiten the snow |
| 5 | Water badly shot | If you have a tripod, use a long exposure to achieve the silky, white look of rushing water. |
| 6 | Foreground objects with sunset/rise in the background | — |
| 7 | Flat sunset with unnatural colors | Disable white balance and flash to achieve a silhouette effect on foreground objects. |
| 8 | No degradation | — |

As illustrated in FIG. 1, the layout of the photo guide 10 complements the set of images printed and delivered to clients of the photofinishing lab. The header of the document contains information about the set of processed images (Album), the name of owner of the images and the date.

The user can match the printed images 24 with the corresponding guideline 14 through the inspection of the thumbnails 12. Each guideline indicates which kind of enhancement (i.e., correction) has been applied and what has been fixed (i.e., degradation). For the benefit of the user, a tip 16 is attached to avoid specific degradations at a future shooting time.

In one evaluation, results were collected on four albums (sets 33 of images) for a total of 120 images. The images were classified and subsequently enhanced with AIE. Log files were analyzed and features vectors $f_d$ extracted. TABLE 3 summarizes statistics on the applied enhancement methods. The most common combinations of active enhancements (obtained by suppressing the combinations of enhancements that activated less than 3 times) are shown. The most frequently activated enhancement was exposure (82%) whereas global contrast and noise removal are the less used (12.5 and 2.5% respectively).

TABLE 3

| Enhancement | Percent |
|---|---|
| Sharpness, Color balance, White exposure, local contrast | 3 |
| Sharpness, Color balance, White exposure | 13 |
| Sharpness, Saturation, Exposure, Local contrast | 4 |
| Sharpness, Exposure, Local contrast | 22 |
| Sharpness, Exposure | 24 |
| Sharpness, Local Contrast | 8 |
| Sharpness | 11 |
| Color Balance, White Exposure, Global contrast | 10 |
| Color Balance, White Exposure | 7 |

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:
1. An automated method for generating an image quality guide document, comprising:
for at least one image in a set of images undergoing image enhancement:

identifying image quality-related features for the image based on enhancements being automatically applied to the image, identifying image content-related features based on content of the image, determining a content-based degradation of the image based on the identified image quality-related features and image content-related features, and retrieving a photograph shooting tip for correcting the degradation in the image, based on the determined content-based degradation; and generating an image quality guide document for the images in the set of images in which a visual representation of at least one of the images is associated with a respective text description that is based on the determined content-based degradation and that includes the shooting tip associated with the image for avoiding the content-based degradation.

2. The method of claim 1, wherein the identifying of image quality-related features for the image includes identifying image quality-related features related to a set of predefined quality-related categories.

3. The method of claim 2, wherein the identifying of image quality-related features includes computing a features vector based on the identified image quality-related features.

4. The method of claim 1, wherein the identifying of image quality-related features for the image includes examining logs of image enhancements performed.

5. The method of claim 1, wherein the identifying of image quality-related features includes identifying image enhancements applied to the image for which an identified image quality parameter actuating the enhancement meets a predetermined threshold.

6. The method of claim 1, wherein the identifying of the image content-related features includes identifying image content-related features related to a set of predefined semantic content based categories.

7. The method of claim 6, wherein the identifying of image content-related features includes computing a features vector based on the identified content-related features.

8. The method of claim 6, wherein the semantic content based categories include a category selected from the group consisting of winter, indoors, portraits, landscapes, seascapes, urban, night lights, and flowers.

9. The method of claim 1, wherein the identifying of the image content-related features includes identifying low level features of the image and classifying the image based on the low level features using a classifier which has been trained on images that are each manually assigned to a semantic category selected from a set of predefined semantic content based categories.

10. The method of claim 1, wherein the determining of the content-based degradation of the image includes combining a first features vector which represents the identified image quality-related features with a second features vector which represents the image content-related features to form a combined vector and inputting the combined vector to a degradation classifier which has been trained on a pool of images which have each been manually classified according to degradation.

11. The method of claim 1, wherein the text description includes a description of the content-based degradation and a corresponding image enhancement applied.

12. The method of claim 1, wherein the images in the set comprise photographs.

13. The method of claim 1, wherein the image quality-related features are selected from the group consisting of image contrast values, saturation, exposure, color balance, brightness, background color, red eye detection, and combinations thereof.

14. An image quality guide document generated by the method of claim 1.

15. A non-transitory computer program product encoding instructions, which when executed on a computer causes the computer to perform the method of claim 1.

16. An apparatus for generating an image quality guide document for a set of images, comprising:

an enhancement detector which outputs image quality-related features for images in the set based on enhancements being applied to the images;

an image content analyzer which outputs image semantic content-related features for images in the set, the image content analyzer identifying low level features of the image and classifying the image based on the low level features using a classifier which has been trained on images that are each manually assigned to a semantic category selected from a set of predefined semantic content based categories;

a degradation classifier which receives the output image quality-related features and image semantic content-related features and outputs a content-based degradation for at least one of the images in the set; and an image quality guide document generator which generates an image quality guide document for the set of images in which at least one of the images is associated with a respective text description that is based on the determined content-based degradation.

17. An image processing system comprising the apparatus of claim 16, and an image enhancement module which outputs information to the enhancement module related to enhancements being applied.

18. An image quality guide document rendered in tangible media which includes an arrangement for a set of processed images and automatically generated associated text descriptions associated with at least some of the images, each text description describing a content-based degradation of the image, an image enhancement applied to correct the degradation and, for at least one of the images, a respective shooting tip for avoiding the content-based degradation.

19. An image processing method comprising:

applying at least one automated image enhancement to at least one of a set of input images to generate a set of enhanced images including automatically evaluating image quality features for the input image to determine whether the image meets predetermined acceptable values for the image quality features;

identifying image quality-related features for the at least one input image based on a stored log of the at least one applied enhancement;

identifying image content-related features based on content of the at least one image; and generating an image quality guide document for the set of images in which at least one of the images is associated with a respective text description that is based on the identified image quality-related features and image content-related features.

* * * * *